US006982049B1

(12) United States Patent
Mabey et al.

(10) Patent No.: US 6,982,049 B1
(45) Date of Patent: Jan. 3, 2006

(54) FIRE RETARDANT WITH MOLD INHIBITOR

(75) Inventors: Michael John Mabey, Sherwood Park (CA); Karlan C. Kastendieck, St. Charles, MO (US); William Kish, Wadsworth, OH (US); Keith G. Kastendieck, Washington, MO (US)

(73) Assignee: No-Burn Investments, L.L.C., Wadsworth, OH (US)

( * ) Notice: Subject to any disclaimer, the term of this patent is extended or adjusted under 35 U.S.C. 154(b) by 0 days.

(21) Appl. No.: 11/002,730

(22) Filed: Dec. 2, 2004

Related U.S. Application Data

(60) Provisional application No. 60/526,456, filed on Dec. 3, 2003.

(51) Int. Cl.
C09K 21/04 (2006.01)
C09K 21/08 (2006.01)
C09K 21/10 (2006.01)
C09K 21/14 (2006.01)

(52) U.S. Cl. .................... 252/606; 252/603; 252/607; 252/608; 252/609; 106/18.16; 523/179

(58) Field of Classification Search ............... 252/603, 252/606, 607, 608, 609; 106/18.16; 523/179
See application file for complete search history.

(56) References Cited

U.S. PATENT DOCUMENTS

| | | | |
|---|---|---|---|
| 3,196,108 A | 7/1965 | Nelson | 252/2 |
| 3,257,316 A | 6/1966 | Langguth et al. | 252/2 |
| 3,309,324 A | 3/1967 | Langguth et al. | 252/387 |
| 3,513,114 A * | 5/1970 | Vandersall et al. | 523/179 |
| 3,634,234 A | 1/1972 | Morgenthaler | 252/7 |
| 3,730,890 A | 5/1973 | Nelson | 252/7 |
| 3,934,066 A | 1/1976 | Murch | 428/248 |
| 3,955,987 A | 5/1976 | Schaar et al. | 106/15 FP |
| 3,960,735 A | 6/1976 | Lacey | 252/2 |
| 3,969,291 A * | 7/1976 | Fukuba et al. | 523/179 |
| 4,028,333 A | 6/1977 | Lindvay | 260/45.8 NT |
| 4,137,849 A | 2/1979 | Hontgas et al. | 102/56 R |
| 4,166,840 A * | 9/1979 | Chapman | 423/313 |
| 4,168,840 A | 9/1979 | Chapman | 423/313 |
| 4,201,593 A | 5/1980 | Sienkowski et al. | 106/18.14 |
| 4,201,677 A | 5/1980 | Shukla et al. | 252/8.1 |
| 4,205,022 A | 5/1980 | Nicholson et al. | 260/953 |
| 4,210,452 A | 7/1980 | Nicholson et al. | 106/18.18 |
| 4,216,261 A * | 8/1980 | Dias | 442/84 |
| 4,216,281 A | 8/1980 | Dias | 442/84 |
| 4,221,837 A | 9/1980 | Nicholson et al. | 428/288 |
| 4,226,907 A | 10/1980 | Sienkowski et al. | 428/288 |
| 4,241,145 A | 12/1980 | Shukla | 428/537 |
| 4,265,791 A | 5/1981 | Nicholson et al. | 252/8.1 |
| 4,339,357 A | 7/1982 | Nicholson et al. | 252/606 |
| 4,345,002 A | 8/1982 | Smith et al. | 428/288 |
| 4,365,025 A | 12/1982 | Murch et al. | 521/159 |
| 4,447,336 A | 5/1984 | Vandersall | 252/7 |
| 4,447,337 A | 5/1984 | Adl et al. | 252/7 |
| 4,588,510 A * | 5/1986 | Salyer et al. | 252/5 |
| 4,595,414 A * | 6/1986 | Shutt | 106/18.16 |
| 4,606,831 A | 8/1986 | Kegeler et al. | 252/7 |
| 4,632,813 A * | 12/1986 | Anastasi et al. | 423/310 |
| 4,668,710 A | 5/1987 | Pawloski et al. | 521/171 |
| 4,686,241 A | 8/1987 | Pawloski et al. | 521/107 |
| 4,744,965 A * | 5/1988 | Fairchild | 423/310 |
| 4,822,524 A | 4/1989 | Strickland | 252/603 |
| 4,839,065 A | 6/1989 | Vandersall | 252/603 |
| 4,983,326 A | 1/1991 | Vandersall | 252/603 |
| 5,064,710 A | 11/1991 | Gosz | 428/182 |
| 5,165,904 A * | 11/1992 | Staffel et al. | 423/305 |
| 5,246,652 A | 9/1993 | Hsu et al. | 264/109 |
| 5,399,375 A | 3/1995 | Rood | 427/203 |
| 5,603,990 A | 2/1997 | McGinniss et al. | 427/393.3 |
| 5,626,787 A * | 5/1997 | Porter | 252/4 |
| 5,645,926 A * | 7/1997 | Horrocks et al. | 442/234 |
| 5,702,768 A * | 12/1997 | Orr | 427/236 |
| 5,730,907 A * | 3/1998 | Schultz et al. | 252/400.62 |
| 5,882,541 A * | 3/1999 | Achtmann | 252/8.05 |
| 5,882,641 A | 3/1999 | Achimann | 252/8.05 |
| 5,925,457 A * | 7/1999 | McGinniss et al. | 428/341 |
| 5,968,669 A | 10/1999 | Liu et al. | 428/537.1 |
| 5,989,706 A | 11/1999 | McGinniss et al. | 428/341 |
| 5,997,758 A * | 12/1999 | Barbarin et al. | 252/3 |
| 6,001,285 A | 12/1999 | Wunram | 252/606 |
| 6,025,027 A | 2/2000 | Shutt | 427/337 |
| 6,084,008 A | 7/2000 | Liu | 523/179 |
| 6,130,267 A | 10/2000 | Dueber et al. | 521/128 |

(Continued)

OTHER PUBLICATIONS

Mabey, U.S. Appl. No. 10/132,958, filed Apr. 26, 2002, A.D.

(Continued)

*Primary Examiner*—Joseph D. Anthony
(74) *Attorney, Agent, or Firm*—Christopher John Rudy

(57) ABSTRACT

Fire retardant composition has a mold inhibitor. The composition can embrace a mixture of a substantially neutral ammonium phosphate salt in combination with an active hydrogen-containing nitrogenous organic compound spumific, e.g., urea, and with a hydroxyl-containing carbonific, e.g., a polyol, and further with the mold inhibitor. Such a composition can be made by contacting a phosphoric acid with ammonia to form the ammonium phosphate, contacting the ammonium phosphate with the spumific, the carbonific, and the mold inhibitor, under conditions sufficient to form the composition; and can be used by contacting it with a flammable substrate under conditions sufficient to be flame retardant or mold inhibitory, or both. Another aspect is an article of manufacture comprising, in combination, the fire retardant composition having the mold inhibitor, and the flammable substrate or a residue of the same.

20 Claims, No Drawings

U.S. PATENT DOCUMENTS

| | | | |
|---|---|---|---|
| 6,162,375 A | 12/2000 | Crouch et al. | 252/603 |
| 6,207,085 B1 * | 3/2001 | Ackerman | 252/606 |
| 2005/0022466 A1 * | 2/2005 | Kish et al. | 52/741.3 |

OTHER PUBLICATIONS

Mabey, U.S. Appl. No. 60/287,149, filed on Apr. 30, 2001, A.D.

Mabey, U.S. Appl. 60/526,456, filed on Dec. 3, 2003, A.D.

Kish et al., U.S. Appl. No. 10/957,775, filed on Oct. 4, 2004, A.D.

Mabey et al., U.S. Appl. No. 60/646,245, filed on Jan. 24, 2005, A.D.

Mabey et al., U.S. Appl. No. 11/044,624, filed on Jan. 27, 2005. A.D.

Farrell et al., *Environmental Toxicology and Chemistry,* abstract for vol. 17, No. 8, pp. 1552-1557, 1998.

KIA Inc., Kemco International Associates Biocides (www.kemcointernational.com/Biocides.htm) downloaded Dec. 16, 2004.

The Cary Company, web site Home Page, Products and Flame Retardants & Smoke Suppressant Additives web site pages (www.thecarycompany.com/Home.html) (www.thecarycompany.com/productsl.html) (www.thecarycompay.com/products/Kemgard.html) downloaded Dec. 16, 2004.

Verichem Inc., web site information and product line pages (www.verichem.org/page/5/page5.html?refresh=1079996004846) (www.verichem.org/pages/3/page3/html?refresh=1079996005142) (www.verichem.org/page/2/page2.html?refresh=1079996005008) downloaded Dec. 21, 2004.

Mason Chemical Co., MSDA Mason CS428, Jan. 2003 A.D.

Mason Chemical Co., "MAQUAT 2.5-M," May 1, 2002.

* cited by examiner

FIRE RETARDANT WITH MOLD INHIBITOR

CROSS-REFERENCE CLAIM OF PRIORITY

This claims the benefit by 35 USC 119(e) of U.S. provisional patent application No. 60/526,456 filed on Dec. 3, 2003 A.D. The specification of that application is incorporated herein by reference in its entirety.

FIELD AND PURVIEW OF THE INVENTION

In general, the invention concerns a fire retardant composition with a mold inhibitor, methods to make and use it, and a substrate combined with the composition or residue thereof. The composition can have a first fire retardant agent of an ammonium phosphate substance, plus a carbonific, for example, glucose or pentaerythritol, and a nitrogenous spumific, for example, urea, which are mixed with the mold inhibitor. A generally clear, aqueous liquid can be formed.

BACKGROUND TO THE INVENTION

Various fire retardants are known. Compositions are known that typically contain fire suppressing salts such as an ammonium phosphate or ammonium sulphate for aerial applications to combat forest fires. See, U.S. Pat. Nos. 3,196,108; 3,257,316; 3,309,324; 3,634,234; 3,730,890; 3,960,735; 4,447,336; 4,447,337; 4,606,831; 4,822,524; 4,839,065; 4,983,326 and 6,162,375. Other are known to have fire suppressants such as carbonaceous matter, organic phosphorous compounds, organic halides, or borates. See, U.S. Pat. Nos. 4,668,710; 4,686,241; 5,246,652; 5,968,669; 6,001,285; 6,025,027; 6,084,008 and 6,130,267.

As can be appreciated, in addition to fire retardants used to combat forest fires, intended as a temporary measure to be washed away once the fire threat is minimized, prevention of the spread of fire is an important consideration sought in many everyday materials and construction applications such as paper, fabrics, wood, and many plastics. Much research has been conducted to determine how to reduce and/or eliminate the potential fire hazards caused by these materials.

In general, all organic and some inorganic materials will burn under appropriate conditions. With solid materials, this involves decomposition of the solid to produce gases that burn, rather the burning of the solid per se. The actual burning occurs in four main stages:

1. Heating: an ignition sources raises the temperature of the item;
2. Decomposition: when sufficiently heated, the item begins to change its properties and break down, forming combustible gases;
3. Ignition: combustible gas production increases until a concentration is reached that allows for sustained, rapid oxidation, when exposed to an ignition source; and
4. Combustion and propagation: combustion of the gases becomes self-propagating if the heat generated is sufficient to be radiated back to the item and continue the decomposition process.

Decades ago, most furnishings in the home were made from natural materials including wool, cotton, and horse hair, which were relatively flame resistant; so, if a fire started in the home, it would generally take some eight to ten minutes before flashover would occur, depending on the location of the fire, and availability of flammable materials in close proximity to the source of the fire. If discovered quickly enough, the fire department would arrive to extinguish the blaze before it grew too rapidly and flashover occurred. Flashover, of course, occurs when the rate of combustion and flame spread in the dwelling becomes so rapid that the air becomes super heated, which causes all exposed flammable surfaces to erupt into flames, i.e., "flash over." This produces the equivalent of an explosion, blowing out doors and windows, and causing serious bodily injury of death. Nowadays, most everyday household materials are extremely flammable themselves, being made not only of paper and wood but also synthetic fabric and plastic, the latter, or course, made from petroleum products. Thus, flashover is of increasingly serious concerns. Some of these modern materials may practically burst in flames with a short exposure to the ignition source, and flashover may occur before the fire department can get to the home, even if notified promptly. As can readily be appreciated, therefore, the residential fires of today may be quite tragic when compared to those of past years.

In addressing this, conventional intumescent systems have been developed. They typically include as essential components: (1) an acid-forming substance, which may be referred to as a "catalyst"; (2) an expanding agent, which causes formation of a foamed (intumescent) layer by emission of an inert or non-combustible gas, which agent may be referred to as a "spumific"; and (3) a binder such as a thermoplastic resin, which contributes to the film-forming properties of the system and provides a portion of a char skeleton, and which is usually referred to as a "carbonific." A component may have more than one function. Such phosphate-catalyzed intumescent compositions can be composed of components selected from among the following:

1. As the acid source (catalyst), usually amino phosphates, mainly ammonium polyphosphates, ammonium orthophosphate, and melamine phosphate, say, in an amount of about 25% by weight of the total formulation.

2. As the spumific, melamine, melamine salts, melamine derivatives, urea and/or dicyandiamide.

3. As the carbonific, a polyhydroxy compound, usually a polyol, which is decomposed by liberated phosphoric acid to form an ester that results in formation of the char (carbonification), for example, pentaerythritol, dipentaerythritol, tripentaerythritol, or certain sugars, starches or starch derivatives.

Two disadvantages with these conventional systems are cost and opacity. Opaque compounds such as ammonium polyphosphate in powder form, powdered amines and carbonific components are often employed. These tend to be not only expensive, owing to the materials and their labor-intensive production, but also less desirable aesthetically, say, on woodwork where its exposed surface if sought after as an architectural feature.

In address of the foregoing, Mabey, in U.S. patent application No. 10/132,958 filed on Apr. 24, 2002 A.D., disclosed a fire retardant, which, in general, is a composition comprising a mixture of a substantially neutral ammonium phosphate salt in combination with an active hydrogen-containing nitrogenous organic compound, and with a hydroxyl-containing carbonific. It can be made by contacting a phosphoric acid with ammonia to form the ammonium phosphate, contacting the ammonium phosphate with the active hydrogen-containing nitrogenous organic compound and the hydroxyl-containing carbonific under conditions sufficient to form the composition; and can be used by contacting it with a flammable substrate under conditions sufficient to be flame retardant. Also disclosed was an article of manufacture comprising, in combination, the fire retardant composition and the flammable substrate or a residue of the same. Typical amounts of weight of preferred components effective therein are listed as follows:

| | |
|---|---|
| Mono/diammonium phosphates | 20~70% |
| Diluent (solvent) of water | 25~50% |
| Urea | 2.5~15.0% |
| Glucose | 4.0~12.0% |
| Polysaccharide resin | 2.0~40.0% |
| GLUCOPON-425 surfactant | 0.2~1.2% |
| Potassium salicylate solution | 0.01~0.1%. |

The composition of the Mabey '958 application is indeed highly effective and desirable. However, it would be desirable to improve upon the art.

SOME OBJECTS OF THE INVENTION

It is an object and part of this invention to provide mold-inhibition to a first retardant, notably that disclosed by the Mabey '958 application, while retaining desirable properties of the composition. It is a further desirable object and part of the invention to provide for control of toxic black mold (*Stachybotrys chartarum*), a problematic mold of serious concern, on the surface of materials coated with the composition.

These of other objects are satisfied if not wholly at least in part by the present invention.

FULL DISCLOSURE OF THE INVENTION

In general, the present invention provides, in one aspect, a fire retardant composition having a mold inhibitor, which can comprise a mixture of a substantially neutral ammonium phosphate salt in combination with an active hydrogen-containing nitrogenous organic compound, and with a hydroxyl-containing carbonific, and further with the mold inhibitor. Such a composition can be made by contacting a phosphoric acid with ammonia to form the ammonium phosphate, contacting the ammonium phosphate with the active hydrogen-containing nitrogenous organic compound, the hydroxyl-containing carbonific, and the mold inhibitor, under conditions sufficient to form the composition; and can be used by contacting it with a flammable substrate under conditions sufficient to be flame retardant or mold inhibitory, or both. Another aspect is an article of manufacture comprising, in combination, the fire retardant composition having the mold inhibitor, and the flammable substrate or a residue of the same.

The invention is useful in retarding fire and controlling mold and so forth fauna.

Significantly, by the invention, an effective, cost-efficient, aesthetically pleasing and/or generally safe fire retardant having mold inhibition is provided. The invention ameliorates or solves one or more of the problems in the art. For instance, flammable construction stock such as wooden board stock is provided with good fire retardant ratings and effective control mold control; application of the composition is simple and easy; and a clear formulation can be provided to highlight the beauty of natural woodwork. A particular embodiment provides for control of toxic black mold in a fire retardant. Addition of the mold inhibitor adds notable value to the fire retardant. The composition of the invention can advantageously be applied directly to a wide range of materials, including wood, plywood, oriented strand board and chip board sheathing, paper, fabrics, corrugated board materials, and so forth and the like. The composition is moderately inexpensive and safe to manufacture, store, transport and use. One of the many advantages of the present composition is that, since it can be applied directly to materials, this greatly reduces the financial and environmental costs of rendering materials fire retardant. Further, building materials may be rendered fire retardant during or after construction by direct application of the present composition, which may eliminate much cost and difficulty in building construction. Application to inside substrates is particularly beneficial. The composition may be considered to be an intumescent fire retardant/mold inhibitor. In certain embodiments, the invention may be considered an improvement in kind over that of the '958 Mabey application.

Numerous further advantages attend the invention.

The invention can be further understood by the additional detail set forth below. The same, like that set forth above, is to be taken in an illustrative and not necessarily limiting sense.

Broadly, the invention combines a fire retardant with a mold inhibitor.

A foundation of preferred embodiments of the invention is that a clear or substantially clear fire retardant surface treatment can result from reacting phosphoric acid with ammonium hydroxide in a stoichometric ratio sufficient to make an aqueous solution of substantially neutral pH, which includes monoammonium and diammonium phosphates, in an exothermic reaction. The solution, which is an example of an essentially or substantially neutral ammonium phosphate salt, next is contacted or combined, perhaps reacted, with an active hydrogen-containing nitrogenous organic compound such as urea, and also with a hydroxyl-containing carbonific such as glucose or pentaerythritol to produce a typically viscous fire retardant solution.

To that solution or a precursor stage thereof is added the mold inhibitor. Preferably, the mold inhibitor is added to the viscous fire retardant solution, especially promptly or immediately upon its manufacture. Notably, incorporation of the mold inhibitor, which may be a fungicide, into a very fresh retardant solution can be much more simple and effective than when the fire retardant solution is cold or has been standing for any significant time. This can be especially so when the fire retardant solution is a preferred embodiment of the '958 Mabey application or modification thereof and the mold inhibitor is a fungicide such as didecyldimethylammonium chloride (diDe-diMe-AmCl), an alkyldimethylbenzylammonium chloride (Alk-diMe-Bz-AmCl), and/or another mold inhibitor that is chemically compatible and stable in the solution, and so forth and the like.

Accordingly, the composition of the invention may be considered, in certain embodiments, to be a substantially if not essentially neutral ammonium phosphate salt in a matrix of a urea and a hydroxyl-containing carbonific, which has the mold inhibitor. The composition can form a coating and typically dries on the substrate.

The term "fire retardant composition," as employed herein is a composition that, when applied to a flammable material, provides thermal protection for the material. In general, this may be done by reducing or perhaps even eliminating the tendency of the material to burn and/or by reducing the rate of flame spread along the surface of the material. Preferably, use of the fire retardant composition, for example, on a solid material such as wood substrate, reduces surface burning characteristics significantly, say, at least about 10%, at least about 25%, or at least about 50%, when compared to corresponding but untreated material, as tested by an appropriate test. For example, the test may be the ASTM E84 Steiner Tunnel Test. Without being bound by any theory, the preferred fire retardant composition of the present invention, based in general on the '958 Mabey fire retardant, is believed to operate generally as follows: The fire retardant composition decomposes under the heat of the fire to produce a nonflammable gas as well as a light weight char, which occurs at a lower temperature than the item on which it is applied would release flammable gases. The char formed as the ammonium phosphate breaks down, releasing ammonia gas, which leads to reaction of the phosphate with the carbon-bearing compounds to form a nonflammable ester. As the nitrogen-containing compounds break down to release non-flammable gas, the gas becomes trapped in the carbon mass, tending to puff it up, forming a char pillow. The char pillow, by reducing air flow, and hence, oxygen, and by reducing or blocking heat-transfer to the surface, tends to reduce the burning-propensity of the treated surface. As a result, fire is robbed of fuel and oxygen, generates less heat and smoke, and may in some circumstances extinguish itself.

The term, "mold inhibitor" as employed herein is an agent that can kill, control, or prevent growth of mold, mildew, or fungus, and so forth and the like flora, especially when formulated with a basic fire retardant composition. A mold inhibitor may be fire retardant or fire accelerative, but in the latter case, does not accelerate fire to a degree that the overall composition which contains the mold inhibitor cannot be considered to be a fire retardant composition. Preferably, however, use of the fire retardant composition with mold inhibitor, for example, on a solid material as the substrate, reduces growth of the flora of interest significantly, say, at least about 60%, at least about 85%, or at least about 99% or even at least about 99.9%, if it does not kill outright, for a significant time, say, at least about thirty days, at least about six months, or at least about 360 days or a year, if not, in effect, indefinitely, as tested by appropriate test methodology. For example, the test method may be by ASTM D5590-94, Determination of Resistance of a Coating Material to Fungal Growth.

As the substantially neutral ammonium phosphate slat, any suitable ammonium phosphate, to include ammonium polyphosphates, and mixtures thereof, may be employed. Preferably, however, the substantially neutral ammonium phosphate salt is a mixture which contains monoammonium and diammonium phosphates. The salt may be employed per se, or in conjunction with a diluent. Preferably, a diluent is employed, and, advantageously, the diluent acts as a solvent. Beneficially, the diluent is evaporative, which is to say that it can evaporate in the final product, leaving the fire retardant composition with mold inhibitor, or a residue thereof, with the substrate to which it applied, typically in a film type coating. As such, the diluent acts as a carrier. The diluent can be any suitable substance, including a hydroxyl-containing liquid such as an alcohol, water, or mixture thereof. Water is preferred. In one advantageous embodiment, the substantially neutral ammonium salt can be provided as an aqueous solution having monoammonium, and diammonium phosphates by reacting an about from sixty to ninety-five, preferably about from seventy to ninety, percent by weight solution of phosphoric acid with an about from fifteen to forty, preferably about from twenty to thirty-three, percent by weight solution of aqueous ammonia in a ratio sufficient to produce a mixture with a substantially neutral pH, say, about from six to seven and a half, preferably about from 6.6 to 7.0. Such a solution may be commercially obtained.

The substantially neutral ammonium phosphate salt is combined with the active hydrogen-containing nitrogenous organic compound, i.e., the spumific; the hydroxyl-containing carbonific; and the mold inhibitor. The combination, or contact, of the components may be carried out in any suitable order. Thus, an initial contact may be salt to spumific to prepare a salt-spumific intermediate, followed by contact with the carbonific; an initial contact may be salt to carbonific to prepare a salt-carbonific intermediate, followed by contact with the spumific; or the spumific and carbonific may be initially mixed, with that mixture contacted with the salt. The mold inhibitor may be added at any suitable stage, and may accompany any suitable component or intermediate. Preferably, however, the mold inhibitor is added to the freshly prepared fire retardant composition made from the substantially neutral ammonium phosphate salt, spumific, and carbonific, especially while the composition is still warm from contact and reaction of the initial components. Other component(s) such as wetting agent(s), defoaming agent(s), and so forth, may also be added at suitable time(s). Preferably, however, when the composition includes such other component(s), these are included in an initial fire retardant composition, and the mold inhibitor is added afterwards, preferably, again, while the initial fire retardant composition is fresh, especially warm. Conditions are those sufficient to form the fire retardant composition with mold inhibitor of the invention.

As the hydrogen-containing nitrogenous organic compound, or spumific, any suitable substance may be employed. Preferably, the spumific is compatible with the other components employed, and further is soluble therewith or with any diluent employed. For instance, urea or a substituted urea may be employed. Preferably, however, the spumific is urea.

As the hydroxy-containing carbonific, any suitable substance may be employed. Preferably, the carbonific is compatible with the other components employed, and further is soluble therewith or with any diluent employed, especially water. For instance, a polyol, to include a carbohydrate such as a sugar or starch, may be employed. The polyol thus may be a compound such as glycerol, pentaerythritol, dipentaerythritol, tripentaerythriol; a sugar, say, a monosaccharide such as a triose, tetrose, pentose, hexose, heptose, or octose, to include an aldose or a ketose, or a disaccharide, a triaccharide, a polysaccharide, and so forth; or a starch. A combination of polyols may be employed. Thus, for instance, the spumific can include a six-carbon aldose, with which the polysaccharide may be employed.

As the mold inhibitor, any suitable substance may be employed. Preferably, the mold inhibitor is compatible with the other components employed, and further is soluble therewith or with any diluent employed. For instance, the mold inhibitor may be a quaternary organic ammonium halide, to include a quaternary alkyl ammonium halide, especially such a halide having at least one short chain and at least one medium chain alkyl group, for example, two of each, and an otherwise corresponding quaternary alkyl aromatic ammonium halide. The halide is advantageously a chloride. The short chain alkyl group may be inclusive of, separately at each occurrence, a one- to an about five-carbon group, especially a one- to four-carbon group, for example, a methyl, ethyl, propyl, and so forth group. The medium chain alkyl group may be inclusive of, separately at each occurrence, an about six- to an about thirty-carbon group, especially a six- to an about twenty-carbon group, for example, a hexyl, heptyl, octyl, nonyl, decyl, undecyl, dodecyl group, a thirteen-, fourteen-, fifteen- or sixteen-, seventeen-, or eighteen-, nineteen-, or twenty-carbon group, and so forth. Preferably, the short chain alkyl group is methyl and/or ethyl, especially methyl, and the medium chain alkyl group is an eight- to twelve-carbon group, to include a mixture thereof, especially decyl, which can be present as an n-alkyl group. The halide is advantageously a chloride. For example, the mold inhibitor employed may be diDe-diMe-AmCl. An aromatic group, to include an aryl, alkaryl and/or arylalkyl group, for example, a benzyl and/or ethylbenzyl group, may be present, for instance, in a quaternary organic to include a quaternary alkyl aromatic ammonium halide mold inhibitor, for example, Alk-diMe-Bz-AmCl. The mold inhibitor may be a mixture containing more than one mold inhibitor compound. An increase in concentration of a quaternary ammonium halide mold inhibitor can provide for a corresponding reduction in the amount of an ammonium phosphate or ammonium orthophosphate.

The mold inhibitor is employed in any amount sufficient to provide for kill, control or prevention of growth of the target organism(s). It may be employed by weight of the final product in an amount up to fifteen or twenty percent or more, to include, independently at each occurrence, lower values in specified ranges of about one tenth, about one half, about one, and about two percent, and upper values in specified ranges of about ten, about eight, about five and one half, and about four percent. A preferred amount of the mold inhibitor by weight of the final product, which may be coupled with a lower or an upper value amount as noted above or elsewhere herein to provide another value for a specified range, is generally about three percent.

A wetting agent, or surfactant, may be added. Preferably, any surfactant is biodegradable. Generally, when employed, the surfactant is present in an amount sufficient to effectively release surface tension in the composition and to allow it to effectively and evenly penetrate the substrate before substantial evaporation of a diluent. Any suitable surfactant may be employed. In preferred practice of the present invention, however, since the fungicide may function as a surfactant agent, particularly if it is of the quaternary ammonium salt variety, as are diDe-diMe-AmCl and Alk-diMe-Bz-AmCl, if surfactant activity is desired, it typically is not necessary to provide any additional surfactant. If an added surfactant is desired, the added surfactant may notably be a nonionic alkylpolyglycoside surfactant, which, for instance, may be commercially available, for example, under the mark GLUCOPON (Henkel Corporation). The GLUCOPON surfactants are more readily biodegradable than conventional petroleum-based surfactants, and have been found to be much safer in testing with land and marine animals, while advantageously offering performance comparable to conventional surfactants in the fire retardant compositions of the invention. GLUCOPON surfactants, which were specifically formulated for cleaning product formulation technology, are made from renewable raw materials; glucose from corn, and fatty alcohol from coconut and palm kernel oils. The surfactant is typically supplied as an aqueous solution containing 50% to 70% active matter, having an alkaline pH (11.5–12.5) with no preservative added. Some GLUCOPON surfactants are also available at neutral pH with an anti microbial preservative added. Although perhaps any grade of GLUCOPON surfactant may be used successfully, GLUCOPON-425 may notably be employed as an added surfactant.

A defoaming agent may be added. Any suitable defoaming agent may be used, for instance, a salicylate salt, or a silicon compound. The defoaming agent may be potassium salicylate, which is also known to function as a preservative.

Any suitable amount of a component may be employed. Some typical amounts as percents by weight of generally preferred components effective in the practice of the invention are listed as follows, of which any specified components or characteristics are exemplary and for purposes of illustration, and which listed amounts may be taken as approximate:

| | |
|---|---|
| Mono/diammonium phosphate(s) | 20~70% |
| Diluent, e.g., solvent, say, water | 25~50% |
| Spumific, e.g., urea beads | 2.5~15.0% |
| Sugar, e.g., glucose | 4.0~12.0% |
| Polysaccharide resin | 2.0~40.0% |
| Added surfactant, e.g., GLUCOPON-425 | 0.2~1.2%, advantageously none |
| Added defoaming agent, e.g., potassium salicylate in solution | 0 or 0.01~0.1% or 0.01~0.5% |
| Mold inhibitor, e.g., diDe-diMe-AmCl | 0.1~10%, to include 0.5~5.5%. |

As an alternative, more detailed or preferred formulation to the preferred formula listed above, or as another manner of expressing such, typical amounts as percents by weight (unless otherwise specified or known from context or art) of components effective in the practice of the invention are listed as follows, again, of which any specified components or characteristics are exemplary and for purposes of illustration, and which listed amounts may be taken as approximate:

| | |
|---|---|
| Ammonium orthophosphate (40% aqueous solution) | 50~70% |
| Polysaccharide resin, e.g., Lorama LPR76 (45% aqueous solution) | 20~30% |
| Sugar, e.g., granulated cane sugar | 5~10% |
| Spumific, e.g., urea | 5~7% |
| Added defoaming agent, e.g., potassium salicylate in solution | 0 or 0.01~0.1/0.5% |
| Mold inhibitor, e.g., Alk-diMe-Bz-AmCl (80% aqueous solution). | 0.5~5% |

These ingredients may be stirred until dissolved, making a mixture free of solids and forming a clear liquid with pH, say, about 6.8. However, the mixture may be slightly cloudy or even in some cases more cloudy, or with strata in some cases, yet be effective and appealing.

It is to be understood, however, that many suitable materials may be used as the fire retardant and mold inhibiting agents of the present composition. In the preferred embodiment, the fire retardant compound is made from a combination of mono and diammonium phosphate salts formed from reacting about from 75% to 85% solutions of phosphoric acid ($H_3PO_4$) with aqueous ammonia ($NH_4$) in sufficient stoichiometric ratios to produce a generally pH neutral solution, and then further reacting the carbon rich material as above and the nitrogen rich urea to form a viscous liquid. To this mixture is added the wetting agents and the defoaming agents mentioned earlier. While this composition is fresh, and still warm, the mold inhibitor is added. Each of the starting compounds to make the preferred embodiment is commercially available. The mixture is stirred, again, preferably to dissolve the ingredients and provide a clear solution. As noted above, strata may appear. The mixture is preferably stirred again before application.

As an aqueous solution, the pH of the final product can be approximately neutral, for instance, about from five and one half to eight, say, about from six to seven and a half, preferably about from 6 to 7, more preferably and independently at each occurrence about from 6.2 or 6.6 to 6.8 or 6.9. Along these lines, in general, too high a pH, say, above 6.8 or so, may release a discernable ammonia smell, and too low a pH, say, below 6.6 or so, may engender corrosion on certain substrates with which the product comes into contact. The final product may have any suitable density or specific gravity, for instance, about from one to oen and a half, say about from one and a tenth to one and a third. The specific density may be about from 1.15 to 1.3, to include about from 1.18 to 1.25, without the mold inhibitor; and may be, in general, about from 1.10 to 1.17 with the mold inhibitor. Active fire retardant composition component ingredients, less the mold inhibitor, may be present in any amount, to include about from 40% to 60%, preferably about from 45% to 55%, say, about 48%±about 0.5%, to include about 48%±about 0.3%, of the total weight of the fire retardant composition component of the invention. In terms of total weight percent of the final composition, to include the added mold inhibitor, the active ingredients can be present in any effective amount, to include about from 40% to 70%, preferably about from 45% to 55%, say, about 50%±about 0.5% or 51%±about 0.5%.

The fire retardant composition with mold inhibitor of the invention may penetrate to some degree, while may be a small amount. It may reside substantially on the surface of the substrate. However that may be, preferably, once dried, it leaves a substantially transparent film on the surface of a flammable solid substrate. This results in a composition or residue of the same, which is believed to be relatively safe in application and after drying. Suitable precautions, however, should be undertaken. This results also in a versatile fire retardant composition with mold inhibitor, which can be employed in situations in which the aesthetic appearance of a substrate such as neutral or stained woodwork is to remain visible, or in which it would be beneficial to retain visual integrity of another substrate. The preferred liquid composition, of the present invention is rapidly absorbed to an extent by porous materials such as wood, fabric, paper, cardboard, and so forth and the like, where it may remain, in essence, indefinitely, if protected from rain and other forms of excess moisture. Advantageously, there is nothing in the formulation of the present invention known to be substantially harmful to wood per se, plywood, or any other wood product in general. Further, since the present fire retardant composition with mold inhibitor is often only applied to the surface, it should not interact with, degrade, or otherwise deteriorate plywood, sheathing, or other types of glued or composite wood products, particularly deep in the substrate.

The fire retardant composition with mold inhibitor of the invention may be applied to the materials by any suitable method. Known methods may be employed. The composition may be applied by spraying, say, by hand-held trigger sprayers, pump-up pressure sprayers, or any other type of manual or automatic power-assisted spraying apparatus, including by power paint rollers (saturated rollers); airless sprayers; brushing; dipping; and so forth. Advantageously, the composition is applied by spraying. Brushing is a simple, effective expedient. These and other application processes are well known in the art and are subject to many variations. The fire retardant composition with mold inhibitor of the present invention is applied at any suitable concentration or rate to produce a material treated with an effective amount of fire retardant and mold inhibitor.

Among benefits of the composition of the invention, in general, is that, rather than worrying about putting out a fire, it prevents or substantially retards one from burning. If a fire would start, such a composition automatically reacts to the fire by combining with the combustible gases and tars, converting them to carbon char, nitrogen and carbon dioxide, which delays, retards, or extinguishes the source of combustion before the fire takes hold. Its characteristics can also help improve the environment about a structure on fire by eliminating the production of a significant amount, say, up to some 90%, of the smoke and toxic gases produced by a regular fire, which is important because the majority of fire deaths are caused by inhalation of toxic smoke and fumes long before the fire ever gets close to the victims.

Moreover, the mold inhibition properties of the present composition can help protect structural integrity of a building structure or part(s) thereof to which it is applied, for example, to floor, ceiling or attic joists, sub flooring, wooden or composite wall, ceiling or roof boards or sheets, and so forth. In a significant way, too, the health of occupants or visitors can be aided from detrimental effects of mold that otherwise would have been present.

The following examples further illustrate the invention. Therein, parts and percentages are given by weight, unless otherwise specified.

EXAMPLE 1

In a clean, appropriately sized mixing tank, the following raw materials were added under constant agitation:

32 gallons (320 lb.) of 49% solution of mono/diammonium phosphate (a reaction product of 75% to 85% liquid phosphoric acid and 27% ammonia in water at a ratio sufficient to product a pH of 6.8, the reaction of which is exothermic, which serves to heat the mixture);

170 grams of potassium salicylate solution in water;

1135 grams GLUCOPON-425 nonionic alkylpolyglycoside surfactant (Henkel Corp.);

32 lb. urea beads (fertilizer grade);

40 lb. glucose.

All these ingredients were stirred until completely dissolved, until the mixture was free of solids and formed a clear liquid with a pH of 6.8. To this mixture, while the solution was still quite warm, was added 132 lb. of JA250-3 polysaccharide resin (Lorama Chemicals, Mississauga, Ontario), which serves to thicken the mixture and contribute solids for the char-forming reaction. While this mixture was still warm, 3% of BARDAC-2280 didecyldimethylammonium chloride fungicide (an aqueous mixture having 80% active component) (Lonza, Inc., Fair Lawn, N.J.) was added and stirred into the mixture using a high sheer mixer.

A retained sample was drawn from the completed batch and was analyzed for specific gravity, pH, and clarity. The specific gravity was 1.256 @19C; the pH was 6.8, and the sample passed the clarity test, i.e., the liquid was clear to slightly opaque, with no precipitants visible, notably by the naked eye. The finished product was pumped to a storage tank for later filling, or was filled into proper containers.

EXAMPLE 2

The liquid composition of Example 1 was applied to the surface of Red Oak tongue and grooved flooring at a rate of 300 square feet per U.S. gallon in two coats, and allowed to dry in a conditioned from at 72 degrees F and 50% relative humidity until the product had dried and reached a constant mass. Once dried to constant mass, the panels were tested under the ASTM E84 procedure, which resulted in a Flame Spread Rating of 35.

Untreated Red Oak tongue and grooved flooring from the same batch of lumber was tested under the ASTM E84 procedure to determine the inherent flammability of the panels. The identical but untreated panels had a flame spread rating of 70, which serves to demonstrate the effectiveness of the fire retardant properties of the composition of this invention.

EXAMPLE 3

The liquid composition of Example 1 was applied in a thin layer by brush to the surface of small, uniformly sized pieces of wood, i.e., Douglas Fir plywood and Spruce lumber, and subjected to the ASTM D5590-94 test method, employing the mold species known as *Stachybotrys chartarum*. After the required duration of the test, the untreated samples were completely covered with mold growth while the treated samples were mold free. The results were outlined in Report Number 030819-8, "Evaluation of Fungicidal Resistance of Coatings Materials," conducted by PBR Laboratories, Inc., Edmonton, Alberta, Canada.

EXAMPLE 4

The procedure of Example 1, employing a didecyldimethylammonium chloride fungicide, was basically repeated, except that no added surfactant such as the GLUCAPON-425 nor added defoamer such as the potassium salicylate was added. An equivalent amount of water replaced the GLUPACON-425. The resultant product was most satisfactory.

EXAMPLE 5

A commercial formulation was prepared, generally according to the procedures of Examples 1 and 4. The protocol for the same is generally as follows:

A. An appropriately sized mixing tank is selected and checked for cleanliness. If necessary, it is cleaned using hot water and a detergent solution, and rinsed.

B. Raw materials are weighed and added to a mixing tank, beginning with water.

C. After all raw materials have been added, solution is allowed to mix for 60 minutes or until all solids appear to be dissolved.

D. A retained sample is drawn, and analyzed for specific gravity, pH, and clarity.
  1. If approved by quality control, the product is released to be filled.
  2. If the retained sample fails any of the tests, then corrective measures are implemented, and another retained sample is drawn and tested.

E. Approved finished product is pumped to a storage tank for later filling, or filled into proper containers.

This finished coating formulation has the following ingredients, in general:

| | |
|---|---|
| Ammonium phosphate/orthophosphate (40% aqueous solution) | 59.0% |
| Lorama LPR76 polysaccharide resin (45% aqueous solution) | 24.24% |

-continued

| | |
|---|---|
| Granulated cane sugar | 7.29% |
| Urea | 5.78% |
| Mason CS428* alkyldimethylbenzylammonium chloride (80% aqueous solution). | 3.69% |

*Mason CS428 (Mason Chemical Co., Arlington Heights, Ill.) is classified as a surfactant (MSDS). It contains alkyldimethylbenzylammonium chloride ($C_{12-16}$) (CAS #68424-85-1) (80% by weight); ethanol (CAS #64-17-5) (10% by weight); and water (10% by weight).

This aqueous formulation provides a superior home fire retardant with mold resistance.

Wood is the primary resource of most of the homes in the U.S.A. and Canada.

The formulation can be applied by spraying or brushing during manufacturing, building, or remodeling of the home to protect its internal wood components. All such wood components, including wall studs, flooring, rafters, trusses, joists, exterior sheathing, roofing and decking, the entire "skeleton" of the structure, are treated at the "dried-in" from the weather stage, giving special attention to the attic. In addition, the potential exists to treat all the heavy paper backing on all the drywall (gypsum board) for purposes of enhanced fire resistance and to prevent the growth of mold on this surface, which has been shown to support the growth of mold under conditions conducive to the same, such gypsum board, or course, being used with framing materials to substantially provide interior cladding and partition walls in most domestic and commercial building structures.

As well, the formulation can be applied by spraying or brushing to flammable components of an existing structure, for example, exposed wood structural components of an older home such as the exposed floor joists and subflooring accessible in a basement or crawl space, and so forth. Again, special attention is given to the attic area and its joists, studs, flooring, studs, walls, trusses and ceiling (roof sheathing).

In such cases, superior fire resistance ratings with mold resistance are provided.

CONCLUSION TO THE INVENTION

The present invention is thus provided. Various aspects, features, steps, subcombinations and combinations of the invention can be employed with or without reference to other aspects, features, steps, subcombinations or combinations in its practice, and numerous adaptations and modifications can be effected within its spirit, the literal claim scope of which is particularly pointed out as follows:

What is claimed is:

1. A fire retardant composition having a mold inhibitor, which comprises a mixture of a substantially neutral ammonium phosphate salt in combination with an active hydrogen-containing nitrogenous organic compound spumific, and with a hydroxyl-containing carbonific, and further with the mold inhibitor, wherein:

the substantially neutral ammonium phosphate salt has a pH about from 6 to 7½;

the hydroxyl-containing carbonific includes a polysaccharide resin other than starch; and the fire retardant composition as a final product, when present as an aqueous solution, has a pH about from 6 to 7;

the mold inhibitor includes a quaternary organic ammonium halide in an amount sufficient in the final product to provide for kill, control, or prevention of growth of

*Stachybotrys Chartarum* when the final product is applied to a surface of a flammable wood substrate and dried to leave a residue therein and/or thereon; and the final product, when applied to the surface of the flammable wood substrate, can penetrate and, once dried, also leave a see-through film on the surface of the substrate.

2. The fire retardant composition of claim 1, which is aqueous.

3. The fire retardant composition of claim 2, wherein the spumific includes urea; the carbonific includes a polyol; and the quaternary organic ammonium halide includes a quaternary organic ammonium chloride.

4. The composition of claim 1, which includes the following formulation:

| | |
|---|---|
| Mono/diammonium phosphate(s) | about 20–70% by weight |
| Diluent | about 25–50% by weight |
| Active hydrogen-containing nitrogenous organic compound spumific | about 2.5–15.0% by weight |
| Sugar | about 4.0–12.0% by weight |
| Polysaccharide resin | about 2.0–40.0% by weight |
| Added surfactant | 0 to about 1.2% by weight |
| Added defoaming agent | 0 to about 0.5% by weight |
| Mold inhibitor | about 0.1–10% by weight. |

5. The composition of claim 4, wherein the diluent includes water; the spumific includes urea; and the quaternary organic ammonium halide includes a quaternary organic ammonium chloride.

6. The composition of claim 5, wherein at least one of the added surfactant and the defoaming agent is substantially absent.

7. The composition of claim 5, wherein the mold inhibitor is present at about 0.5–5.5% by weight.

8. The composition of claim 7, wherein the mold inhibitor is a quaternary alkyl ammonium chloride or a quaternary alkyl aromatic ammonium chloride.

9. The composition of claim 8, wherein the mold inhibitor is didecyldimethylammonium chloride.

10. The composition of claim 8, wherein the mold inhibitor is alkyldimethylbenzylammonim chloride.

11. The composition of claim 1, which includes the following formula:

| | |
|---|---|
| Ammonium orthophosphate (as 40% aqueous solution) | about 50–70% by weight |
| Polysaccharide resin (as 45% aqueous solution) | about 20–30% by weight |
| Sugar | about 5–10% by weight |
| Urea | about 5–7% by weight |
| Quaternary organic ammonium halide mold inhibitor (as 80% aqueous solution). | about 0.5–5% by weight |

12. The composition of claim 11, wherein the mold inhibitor is alkyldimethylbenzyl ammonium chloride.

13. The composition of claim 1, wherein the fire retardant composition as a final product, when present as an aqueous solution, has a pH about from 6.6 to 6.9.

14. The composition of claim 13, which includes the following, or a proportion thereof, with percentages listed by weight:

32 gallons (320 lb.) of 49% solution of mono/diammonium phosphate (a reaction product of 75% to 85% liquid phosphoric acid and 27% ammonia in water at a ratio sufficient to produce a pH of 6.8);

32 lb. urea;

40 lb. glucose;

132 lb. of polysaccharide resin; and 2.4% didecyldimethylammonium chloride fungicide.

15. The composition of claim 14, wherein a nonionic alkylpolyglycoside surfactant and a salicylate defoamer are also present.

16. The composition of claim 14, wherein an added surfactant and an added defoamer are absent.

17. The composition of claim 13, which includes the following with a percentages tabulated by weight:

| | |
|---|---|
| Ammonium phosphate/orthophosphate (as 40% aqueous solution) | 59.0% |
| Polysaccharide resin (as if 45% aqueous solution) | 24.24% |
| Granulated cane sugar | 7.29% |
| Urea | 5.78% |
| Alkyldimethylbenzylammonium chloride ($C_{12-16}$) (as 80%). | 3.69% |

18. A method for making a fire retardant composition having a mold inhibitor, which composition comprises a mixture of a substantially neutral ammonium phosphate salt in combination with an active hydrogen-containing nitrogenous organic compound spumific, and with a hydroxyl-containing carbonific, and further with the mold inhibitor, wherein:

the substantially neutral ammonium phosphate salt has a pH about from 6 to 7-½;

the hydroxyl-containing carbonific includes a polysaccharide resin other than starch; and the fire retardant composition as a final product, when present as an aqueous solution, has a pH about from 6 to 7;

the mold inhibitor includes a quaternary organic ammonium halide in an amount sufficient in the final product to provide for kill, control, or prevention of growth of *Stachybotrys Chartarum* when the final product is applied to a surface of a flammable wood substrate and dried to leave a residue therein and/or thereon; and the final product, when applied to the surface of the flammable wood substrate, can penetrate and, once dried, also leave a see-through film on the surface of the substrate;

which method comprises contacting a phosphoric acid with ammonia to form the substantially neutral ammonium phosphate salt, contacting the substantially neutral ammonium phosphate salt with the active hydrogen-containing nitrogenous organic compound spumific, the hydroxyl-containing carbonific, and the mold inhibitor, under conditions sufficient to form the fire retardant composition.

19. The method of claim 18, wherein the phosphoric acid is reacted with ammonium hydroxide in a stoichometric ratio sufficient to make an aqueous solution of the substantially neutral ammonium phosphate salt, which includes monoammonium and diammonium phosphates; which salt next is contacted with the active hydrogen-containing nitrogenous organic compound spumific, and also with the hydroxyl-containing carbonific to produce a viscous fire retardant solution; and to that solution is promptly added the mold inhibitor.

20. The method of claim 19, wherein the spumific includes urea; the carbonific includes a polyol; and the composition is aqueous, and at least substantially clear to cloudy when viewed by the naked eye, with a pH for the final product about from 6.6 to 6.9.

* * * * *